(12) United States Patent
Kitazoe

(10) Patent No.: US 8,520,698 B2
(45) Date of Patent: Aug. 27, 2013

(54) PAGING USER DEVICES IN A WIRELESS ACCESS NETWORK

(75) Inventor: Masato Kitazoe, Tokyo (JP)

(73) Assignee: Qualcomm Incorporated, San Diego, CA (US)

( * ) Notice: Subject to any disclaimer, the term of this patent is extended or adjusted under 35 U.S.C. 154(b) by 993 days.

(21) Appl. No.: 12/183,928

(22) Filed: Jul. 31, 2008

(65) Prior Publication Data

US 2009/0061851 A1 Mar. 5, 2009

Related U.S. Application Data

(60) Provisional application No. 60/969,866, filed on Sep. 4, 2007.

(51) Int. Cl.
*H04J 3/00* (2006.01)

(52) U.S. Cl.
USPC .......................................................... 370/464

(58) Field of Classification Search
USPC ......... 370/203, 229–235, 310–337, 342–350, 370/395.1, 395.2, 395.3, 395.4, 395.5, 395.6, 370/400–421, 431–448, 450–463, 464–484, 370/485–502, 503–520, 521
See application file for complete search history.

(56) References Cited

U.S. PATENT DOCUMENTS

| 7,197,323 | B2 | 3/2007 | Terry | |
|---|---|---|---|---|
| 7,346,361 | B2 * | 3/2008 | Kang et al. | 455/458 |
| 7,529,211 | B2 * | 5/2009 | Narasimha et al. | 370/337 |
| 7,555,302 | B2 * | 6/2009 | Butler et al. | 455/458 |
| 7,787,892 | B2 * | 8/2010 | Yang et al. | 455/458 |
| 7,860,527 | B2 * | 12/2010 | Ngai et al. | 455/552.1 |
| 2004/0023672 | A1 * | 2/2004 | Terry | 455/458 |
| 2004/0229605 | A1 * | 11/2004 | Hwang et al. | 455/426.1 |
| 2004/0254980 | A1 * | 12/2004 | Motegi et al. | 709/203 |

(Continued)

FOREIGN PATENT DOCUMENTS

| AU | 2008296334 A1 | 3/2009 |
|---|---|---|
| JP | 5075528 A | 3/1993 |

(Continued)

OTHER PUBLICATIONS

International SearchReport and the Written Opinion—PCT/US2008/075044, International Search Authority—European Patent Office—Feb. 23, 2009.

(Continued)

*Primary Examiner* — Jung-Jen Liu
(74) *Attorney, Agent, or Firm* — Larry S. Moskowitz

(57) ABSTRACT

Providing paging controls for mobile communication is described herein. By way of example, the paging controls can comprise paging occasions of a wireless signal determined from a formula based on an integer raised to a function of a constant power (e.g., $2^K$ or $2^{(K-L)}$, where K and/or L are constant). Selected paging occasions can be grouped within the wireless signal, or distributed throughout a subset of time frames of the signal. Furthermore, paging groups can be assigned to each of the paging occasions by employing distinct identifiers of mobile device assigned to each paging occasion. By employing various paging occasions and paging groups, false alarm pages can be mitigated. According to at least one aspect, system information can be efficiently broadcast to multiple devices (e.g., all devices in a cell) by employing at least one paging group assigned for cell-wide paging.

21 Claims, 12 Drawing Sheets

(56) References Cited

U.S. PATENT DOCUMENTS

| | | | |
|---|---|---|---|
| 2005/0003836 A1* | 1/2005 | Inoue et al. | 455/458 |
| 2005/0148348 A1* | 7/2005 | Cramby et al. | 455/458 |
| 2005/0153715 A1* | 7/2005 | Hwang et al. | 455/458 |
| 2005/0153751 A1* | 7/2005 | Bultan et al. | 455/574 |
| 2005/0164705 A1* | 7/2005 | Rajkotia et al. | 455/436 |
| 2005/0164718 A1* | 7/2005 | Rajkotia et al. | 455/458 |
| 2005/0233732 A1* | 10/2005 | Kwak et al. | 455/414.1 |
| 2005/0288040 A1* | 12/2005 | Charpentier et al. | 455/458 |
| 2006/0128433 A1* | 6/2006 | Liang et al. | 455/560 |
| 2006/0194581 A1* | 8/2006 | Kang et al. | 455/436 |
| 2007/0135081 A1* | 6/2007 | Bultan et al. | 455/343.1 |
| 2007/0161384 A1* | 7/2007 | Terry | 455/458 |
| 2007/0206524 A1* | 9/2007 | Suk | 370/320 |
| 2007/0232330 A1* | 10/2007 | Ranganathan | 455/458 |
| 2008/0188247 A1* | 8/2008 | Worrall | 455/458 |
| 2009/0010255 A1* | 1/2009 | Kim et al. | 370/389 |
| 2009/0040955 A1* | 2/2009 | Jung et al. | 370/311 |
| 2009/0061851 A1* | 3/2009 | Kitazoe | 455/426.1 |
| 2010/0190514 A1* | 7/2010 | Laroia et al. | 455/458 |
| 2010/0279715 A1* | 11/2010 | Alanara et al. | 455/458 |
| 2013/0012206 A1 | 1/2013 | Kitazoe | |

FOREIGN PATENT DOCUMENTS

| | | |
|---|---|---|
| KR | 20020042331 A | 6/2002 |
| RU | 2269208 | 1/2006 |
| WO | WO2007066875 | 6/2007 |

OTHER PUBLICATIONS

Nokia, Nokia Siemens Networks, "Paging Occasions in LTE", R2-073073, 3GPP TSG-RAN WG2 Meeting #59, Aug. 24, 2007, pp. 1-3.

Siemens AG, "Description of DRX for TDD", TSGR2#6(99)853, 3GPP, Aug. 20, 1999, pp. 1-3.

Taiwan Search Report—TW097133976—TIPO—Jan. 10, 2012.

* cited by examiner

PAGING USER DEVICES IN A WIRELESS ACCESS NETWORK

CLAIM OF PRIORITY UNDER 35 U.S.C. §119

The present Application for patent claims priority to U.S. Provisional Application No. 60/969,866 entitled ASSIGNING USER DEVICES TO PAGING GROUPS filed Sep. 4, 2007, assigned to the assignee hereof and hereby expressly incorporated by reference herein.

BACKGROUND

I. Field

The following relates generally to wireless communication, and more specifically to preamble design of a wireless signal facilitating reduced interference for semi-planned or unplanned wireless access networks.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

One function of mobile network technology that facilitates convenient device mobility is the idle/active mode of mobile devices. When active, the mobile device can process incoming signals, transmit reply signals and facilitate remote voice and/or data communication with other devices. Such activity can consume a significant amount of power, however, reducing battery life of the mobile device. Fortunately, a typical user only engages in active device communication periodically. Thus, significant power can be preserved by not processing received wireless signals during period of non-use. Periods of limited or no processing are termed idle periods.

In order to receive inbound communication, the mobile device (e.g., when another user calls the mobile device) is required to process signals indicating that such a communication is pending for the mobile device. While idle, however, the device is processing few or no signals and thus will miss the communication if it does not activate long enough to process those signals. To facilitate active/idle mobility, a base station serving the mobile device coordinates periods of time where the mobile device activates to process incoming signals. These periods of time can be brief and relatively infrequent to reduce average mobile device processing and power consumption in idle mode. When an inbound communication for the mobile device is received at the base station, a paging signal is scheduled and transmitted on one or more of the coordinated periods of time that the mobile device monitors (e.g., activates and processes signals). By coordinating intermittent periods of active signal processing, the mobile device can identify and receive inbound communications while preserving significant processing power and battery life. Such an arrangement provides significant utility for the average mobile device user, increasing device mobility and overall convenience of mobile communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for establishing paging controls for mobile devices coupled with an orthogonal frequency division multiple access (OFDMA) wireless access network (AN). Establishing paging controls can comprise segmenting a wireless signal into a number of time frames determined from an integer raised to a constant power (e.g., $2^K$, where K is a constant). In addition, paging occasions can be scheduled to a portion of the time frames of the wireless signal. Selection of time frames for the paging occasions can be based on a formula that employs the integer raised to a power that is a function of the constant. Selected paging occasions can be grouped within a discontinuous reception (DRX) cycle of the wireless signal, or can be distributed throughout a subset of the time frames based on the above formula. Furthermore, one or more paging groups can be assigned to each of the paging occasions. A paging group can comprise an identifier of an assigned mobile device, which can be utilized by the mobile device to identify the paging group assigned to such device. Paging signals for a mobile device are incorporated into the paging group assigned to the mobile device. By employing various paging occasions and paging groups, false alarm pages can be mitigated in the OFDMA wireless AN, reducing power consumption of the mobile devices and reducing uplink (UL) interference resulting from such false alarm pages. According to at least one aspect of the subject disclosure, the OFDMA wireless AN can also designate at least one paging group that contains an identifier assigned to all mobile devices within a cell of the wireless AN. The at least one paging group can then be utilized to page all devices in the cell with substantially one paging signal initiated by the wireless AN. Accordingly, broadcast paging can be implemented utilizing minimal resources of a wireless signal.

According to additional aspects, provided is a method of paging remote devices in a wireless AN. The method can comprise dividing a wireless signal into a plurality of signal time frames defined as an integer raised to a constant power, $Int^K$. The method can additionally comprise selecting a number, N, of the signal time frames as paging occasions where N is a subset of the signal time frames.

According to other aspects, disclosed is an apparatus for paging remote devices in a wireless AN. The apparatus can comprise a timing module that divides a wireless signal into a plurality of signal time frames defined as an integer raised to a constant power, $Int^K$. Moreover, the apparatus can comprise a selection module that selects a number, N, of the signal time frames as paging occasions where N is a subset of the signal time frames.

According to still other aspects, provided is an apparatus configured for paging remote devices in a wireless AN. The apparatus can comprise means for dividing a wireless signal into a plurality of signal time frames defined as an integer raised to a constant power, Int^K. Furthermore, the apparatus can comprise means for selecting a number, N, of the signal time frames as paging occasions where N is a subset of the signal time frames.

According to at least one further aspect, disclosed is a processor configured for paging remote devices in a wireless AN. The processor can comprise a first module that divides a wireless signal into a plurality of signal time frames defined as an integer raised to a constant power, Int^K. The processor can further comprise a second module that selects a number, N, of the signal time frames as paging occasions where N is a subset of the signal time frames.

According to one or more other aspects, provided is a computer-readable medium comprising computer-readable instructions configured for paging remote devices in a wireless AN. The instructions can be executable by at least one computer to divide a wireless signal into a plurality of signal time frames defined as an integer raised to a constant power, Int^K. Moreover, the instructions can be executable by the at least one computer to select a number, N, of the signal time frames as paging occasions where N is a subset of the signal time frames.

According to one or more additional aspects, disclosed is a method of identifying a paging signal for wireless communications. The method can comprise registering for wireless communication with a wireless AN, registration comprises at least submitting an identifier of a mobile device. The method can additionally comprise obtaining a paging group assigned to the identifier, the paging group is associated with a paging occasion selected from a subset of signal time frames determined from a formula comprising the number two raised to a constant power.

According to other aspects, disclosed is a mobile device configured to identify a paging signal for wireless communication. The mobile device can comprise a transceiver configured for wireless data exchange. The mobile device can further comprise a communication processor that provides an identifier of the mobile device to a wireless AN in conjunction with registering the mobile device with the wireless AN. The mobile device can additionally comprise a signal processor that obtains a paging group assigned to the identifier, the paging group is associated with a paging occasion selected from a subset of signal time frames determined from a formula comprising the number two raised to a constant power.

According to still other aspects, provided is an apparatus configured to identify a paging signal for wireless communications. The apparatus can comprise means for registering for wireless communication with a wireless AN, registration comprises at least submitting an identifier of a mobile device. Moreover, the apparatus can comprise means for obtaining a paging group assigned to the identifier, the paging group is associated with a paging occasion selected from a subset of signal time frames determined from a formula comprising the number two raised to a constant power.

According to one or more additional aspects, disclosed is a processor configured to identify a paging signal for wireless communications. The processor can comprise a first module for registering for wireless communication with a wireless AN, registration comprises at least submitting an identifier of a mobile device. The processor can further comprise a second module for obtaining a paging group assigned to the identifier, the paging group is associated with a paging occasion selected from a subset of signal time frames determined from a formula comprising the number two raised to a constant power.

According to at least one other aspect, provided is a computer-readable medium comprising computer-readable instructions configured to identify a paging signal for wireless communications. The instructions can be executable by at least one computer to register for wireless communication with a wireless AN, registration comprises at least submitting an identifier of a mobile device. Moreover, the instructions can be executable by the at least one computer to obtain a paging group assigned to the identifier, the paging group is associated with a paging occasion selected from a subset of signal time frames determined from a formula comprising the number two raised to a constant power.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
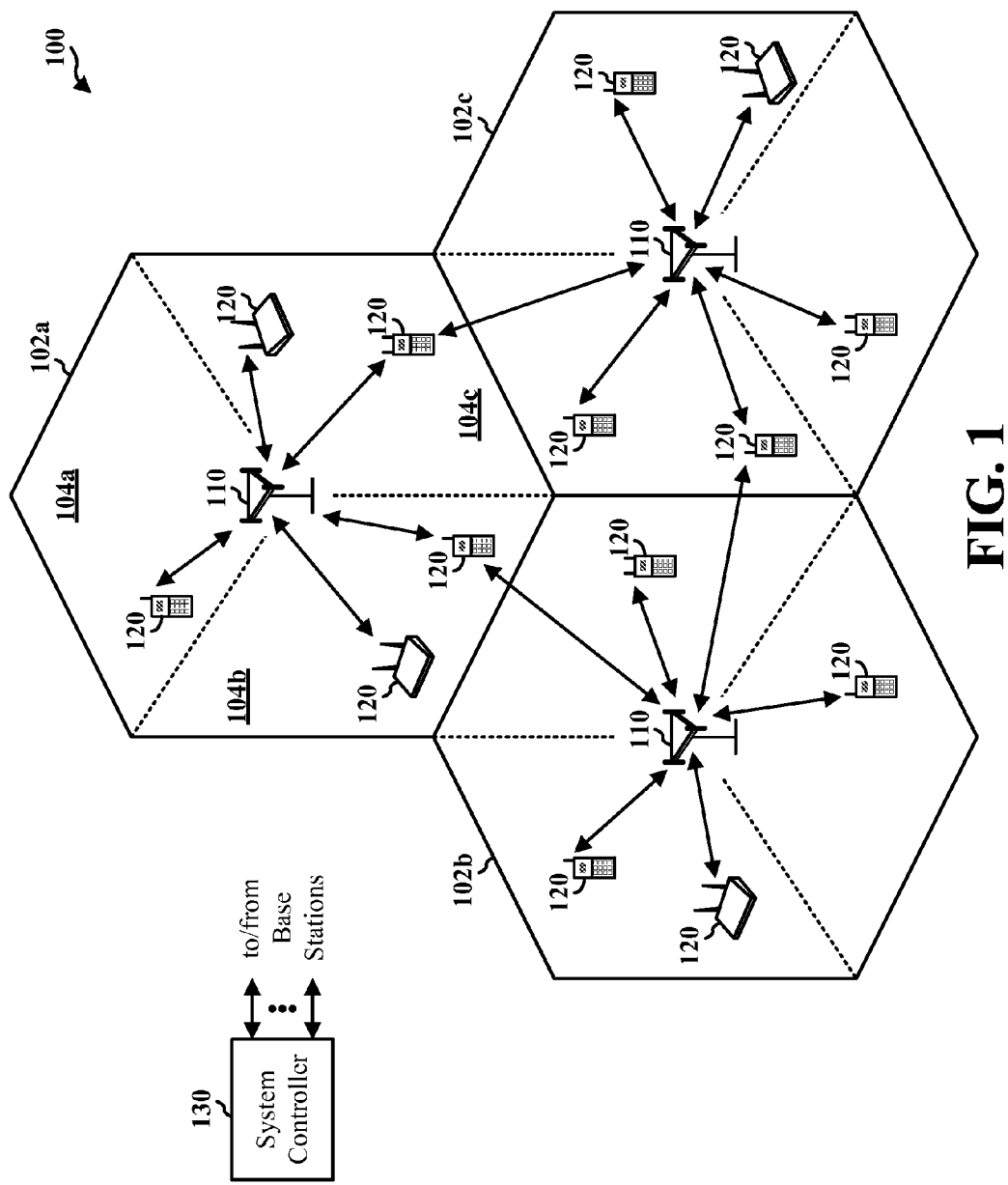
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of establishing device-specific and system wide paging controls for a mobile communication environment. One skilled in the art should appreciate that similar techniques could apply to other communication environments.

The subject disclosure provides for paging controls for a mobile environment (e.g., universal mobile telecommunications system [UMTS], frequency division multiple access [FDMA], orthogonal frequency division multiple access [OFDMA], frequency division multiplex [FDM], evolved UMTS terrestrial radio access network [E-UTRAN], and/or like mobile access networks). Particularly, hashing user devices into portions of a wireless signal to affect paging is provided. Because many user devices can be served by a single network access point at a given time, paging for the user devices is conducted in a plurality of distinct portions (e.g., resources) of the wireless signal. Each user device can be assigned to a distinct signal resource and monitor such resource for paging signals. Where fewer devices are served by an access point than available paging resources, false alarm pages can be avoided (e.g., where multiple devices are paged as a result of an inbound call for just one of the paged devices). Where more user devices are served than available paging resources, multiple devices can be assigned to one or more such distinct portions, if necessary. This can result in false alarm paging, but only for the devices assigned to a single paging resource. Accordingly, the subject disclosure provides for avoiding or mitigating instances of false alarm paging in FDM, FDMA, OFDMA and/or like mobile environments.

According to some aspects of the disclosure, wireless signal paging resources are defined as a number of time and/or identity based portions of a wireless signal. For instance, the signal can be segmented into a plurality of time-based paging occasions. The paging occasions can comprise a time frame of a discontinuous reception (DRX) cycle of the signal. According to some aspects, a paging occasion can comprise a fraction of the time frame, or multiple time frames. In addition to the foregoing, multiple paging groups can be provided for the wireless signal. A paging group can be distinguished based on an identity of a mobile device (e.g., international mobile subscriber identity [IMSI], or like identifier). Thus, ten unique IMSIs of ten devices assigned can be employed to create ten distinct paging groups for such devices. The paging groups can be used to distinguish paging controls for each device. A paging group provided in such a manner can be termed a paging group identity or paging indication radio network identifier (PI-RNTI).

As discussed above, use of paging groups can limit time domain occupancy of paging resources. However, given that a paging group identity can be transmitted with L1/L2 control channels (e.g., in an OFDMA system) and thus the paging group identity is taken from the common identity space, the identity can be a scarce resource as well. Moreover, if a mobile network allows multiple paging groups to be paged in one L1/L2 control signaling, the size of available PI-RNTIs can be relatively limited. In addition, distribution of paging signals in different time frames can help avoid concentrated uplink (UL) interference. For instance, where multiple devices are paged in a single time frame of a downlink (DL) signal, such devices typically will initiate a random access procedure in a common UL time frame that corresponds with the DL time frame. This can result in interference in the UL time frame. Where paging is distributed across various DL time frames, UL interference is mitigated. Accordingly, in at least one aspect of the subject disclosure, identity and time based resources of the wireless signal are employed in combination in a controllable manner. As one example, the paging identity space can be controlled via L3 protocols by signaling the range of PI-RNTIs used for paging group indication.

For time-based paging occasions, the number of frames (or, e.g., sub-frames or groups of frames) utilized for paging can be limited. As one example, an identity and time based paging system could comprise 'N' time-based paging occasion resources and 'M' identity-based paging groups, where 'N' and 'M' are integers. Values of 'M' and 'N' can be system parameters broadcast in the wireless signal with system information (e.g., control channel information). A hashing function utilized to assign mobile devices to a paging group and/or paging occasion (e.g., based on a user's IMSI) can also be broadcast in the system information. According to particular aspects of the subject disclosure, selection of paging resources (e.g., paging occasions and/or paging groups) can be based on a formula comprising an integer raised to a constant power. In at least one aspect, the integer can be two, resulting in a power of two formula. In at least one other such aspect, the power can be a constant related to the DRX cycle of a wireless signal. By employing an integer raised to a constant power (e.g., power of two formula), paging can be made more compatible with other systems. Thus, a mobile device entering a cell served by an OFDMA access point can readily be integrated into paging resources, as discussed in more detail below.

As is disclosed herein, selected time-based signal resources utilized for paging can be scheduled to portions of the wireless signal in different ways. As one example, selected time-based portions can be grouped into a contiguous segment of a DRX cycle of the wireless signal. Location, length, number of partitions, etc., of the contiguous segment can be broadcast with system information. After obtaining the system information, a mobile device(s) can interpret the paging resources and identify a resource allocated to paging signals for that mobile device. In other aspects, time-based paging resources can be selected from the wireless signal utilizing a power of two formula. Such resources can, for instance, be distributed throughout a DRX cycle, depending on a particular formula used, constant values of the formula, and the like. Location of the distributed time-based paging resources can also be broadcast in system information to instruct mobile devices how to interpret the paging signals.

While hashing users over paging groups and paging occasions to reduce occurrence of false alarm paging is beneficial, cell-wide paging can also be advantageous. For instance, where system information pertinent to all mobile devices in a cell is to be updated, paging all such devices on a single paging resource (or, e.g., a small number of paging resources) can be an efficient way of distributing the system information. In some systems, dedicated system-wide resources are not necessary (e.g., in code division multiple access [CDMA] or wideband CDMA [W-CDMA] where a paging indicator channel(s) can employ one or more bits for system wide paging). For E-UTRAN or like systems where PI-RNTIs are transmitted on the L1/L2 control channel, for example, dedicating system-wide resources is not always feasible. As an alternative, the subject disclosure provides for employing a special PI-RNTI, or paging group resource, for system wide paging (e.g., 'paging all devices' resource). According to such an alternative, it is not necessary to page all paging groups and paging occasions to deliver the system wide information. Instead, a user device can be configured to recognize the special PI-RNTI in addition to a dedicated or semi-dedicated PI-RNTI. Accordingly, the user device can process signals in both PI-RNTIs, which can include system-wide paging information as well as device-specific paging information, respectively.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g., data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal—UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the Figures, FIG. 1 illustrates a wireless communication system 100 with multiple base stations 110 (e.g., wireless APs) and multiple terminals 120 (e.g., UTs), such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, unless specified otherwise, the term "base station" is used generically for a fixed station that serves a sector as well as a fixed station that serves a cell.

Terminals 120 are typically dispersed throughout the system, and each terminal 120 can be fixed or mobile. Terminals 120 can also be called a mobile station, user equipment, a user device, or some other terminology, as described above. A terminal 120 can be a wireless device, a cellular phone, a personal digital assistant (PDA), a wireless modem card, and so on. Each terminal 120 can communicate with zero, one, or multiple base stations 110 on the downlink (e.g., FL) and uplink (e.g., RL) at any given moment. The downlink refers to the communication link from the base stations to the terminals, and can at least comprise paging control information (e.g., identifying paging resources of various terminals 120) and paging signals indicating inbound communication. The uplink refers to the communication link from the terminals to the base stations, and can at least comprise system access signals initiated by a terminal 120 in response to a paging signal associated with the terminal 120.

For a centralized architecture, a system controller 130 couples to base stations 110 and provides coordination and control for base stations 110. For a distributed architecture, base stations 110 can communicate with one another as needed (e.g., by way of a backhaul network communicatively coupling the base stations 110). Data transmission on the forward link often occurs from one access point to one access terminal at or near the maximum data rate that can be supported by the forward link and/or the communication system. Additional channels of the forward link (e.g., control channel, paging resources) can be transmitted from multiple access points to one access terminal. Reverse link data communication can occur from one access terminal to one or more access points.

Figure 2:
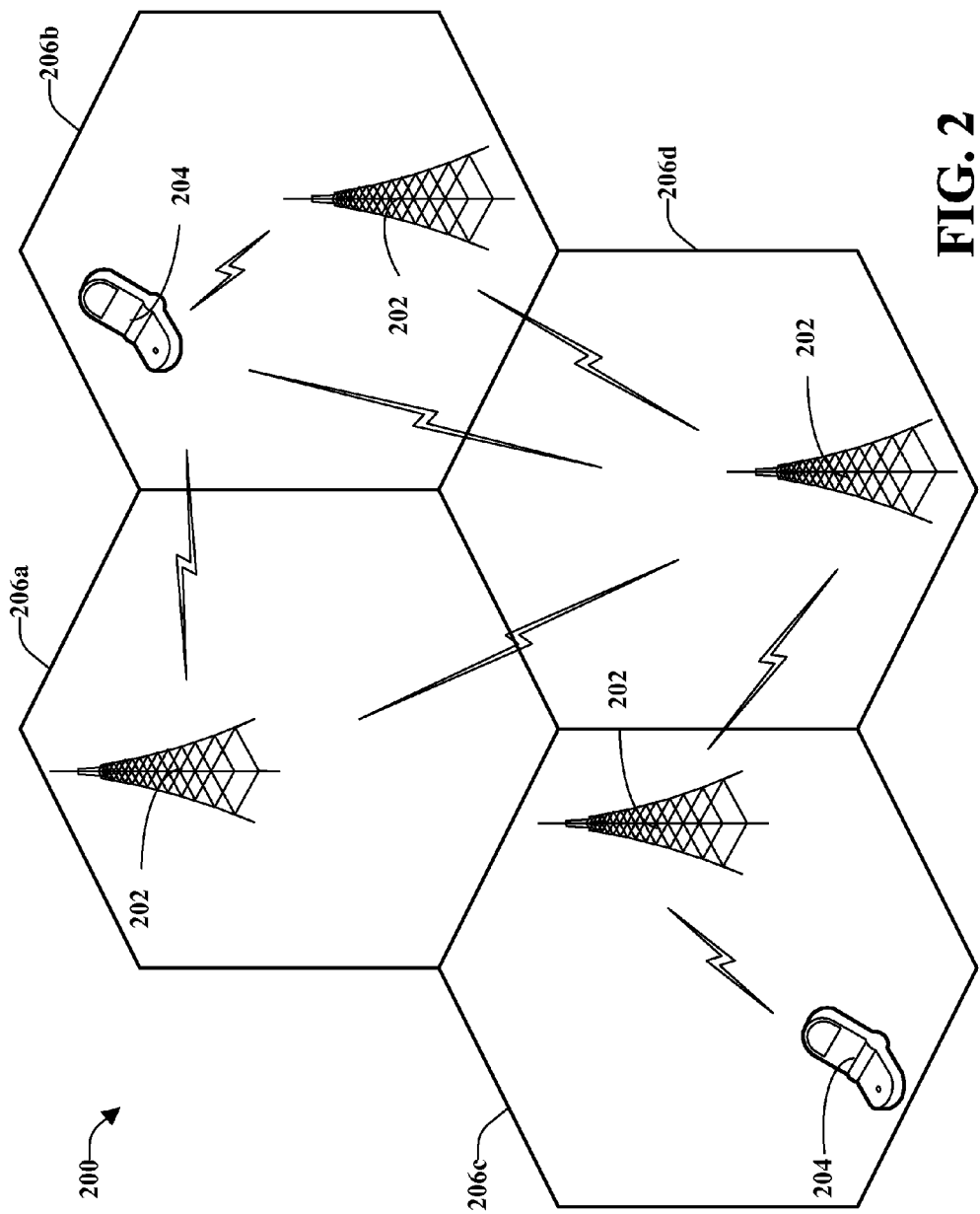
FIG. 2 depicts a block diagram of an example communication apparatus for employment with a wireless communication environment.

FIG. 2 is an illustration of an ad hoc or unplanned/semi-planned wireless communication environment 200, in accordance with various aspects. System 200 can comprise one or more base stations 202 in one or more cells and/or sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects of the subject disclosure in order to provide paging controls for FDM, FDMA, OFDMA, E-UTRAN, or like mobile networks, as set forth herein.

Figure 3:
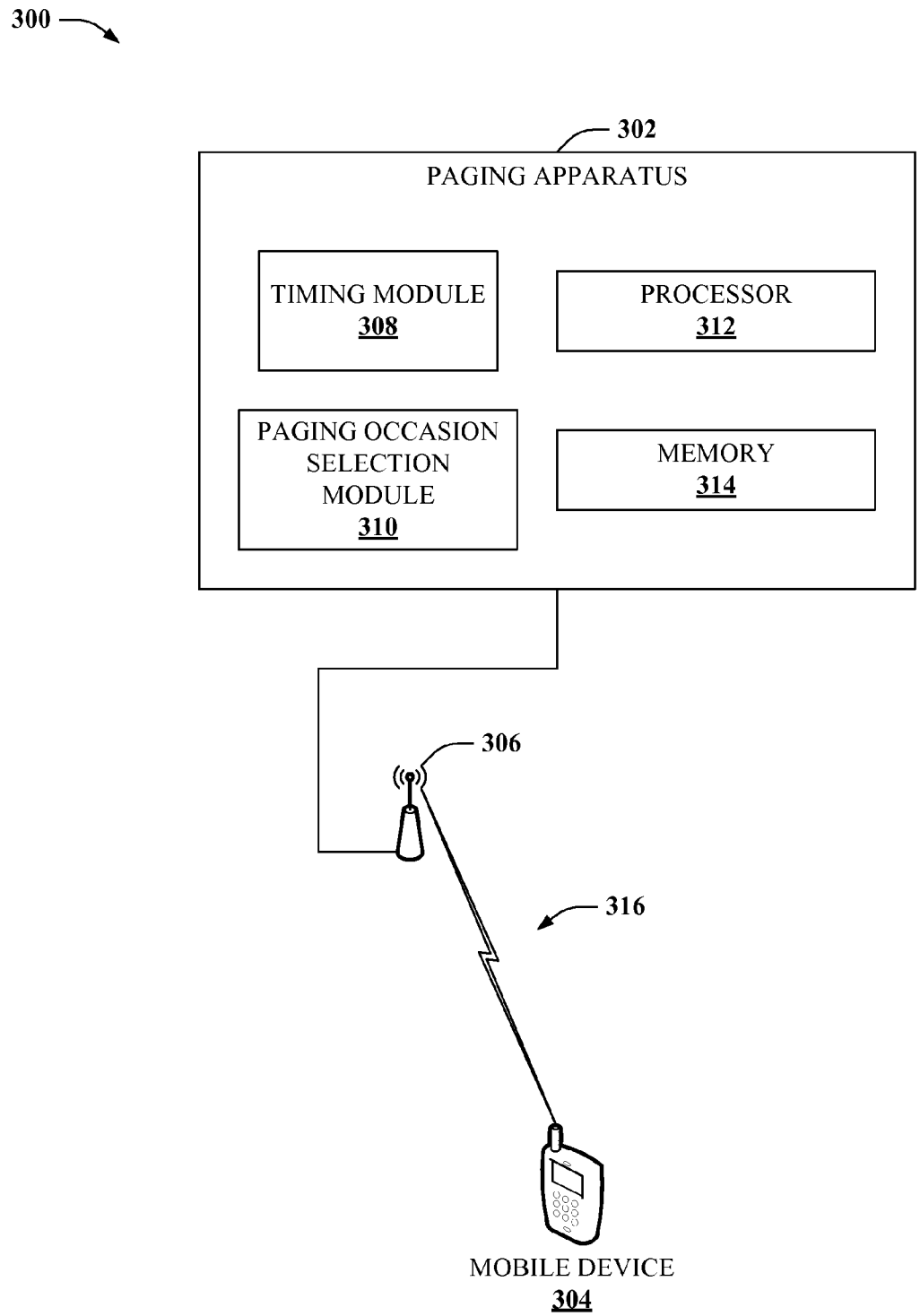
FIG. 3 illustrates a block diagram of an example system that provides paging control for an OFDMA wireless AN according to aspects disclosed herein.

FIG. 3 illustrates a block diagram of an example system 300 that provides paging controls for wireless communication in a mobile operating environment. System 300 comprises a paging apparatus 302 coupled to an access point 306 (e.g., base station) of the mobile operating environment. The access point 306 facilitates wireless communication for one or more mobile devices 304. For instance, the access point 306 can couple the mobile device 304 with a voice network (e.g., a mobile phone network, public switched telephone network, voice over Internet protocol [VoIP] network, not depicted) that facilitates voice communication with remote devices as well as a data network (e.g., the Internet, a private Intranet, or the like, not depicted) that facilitates data communication with remote devices (e.g., a data store, data server, application server, etc.).

Figure 8:
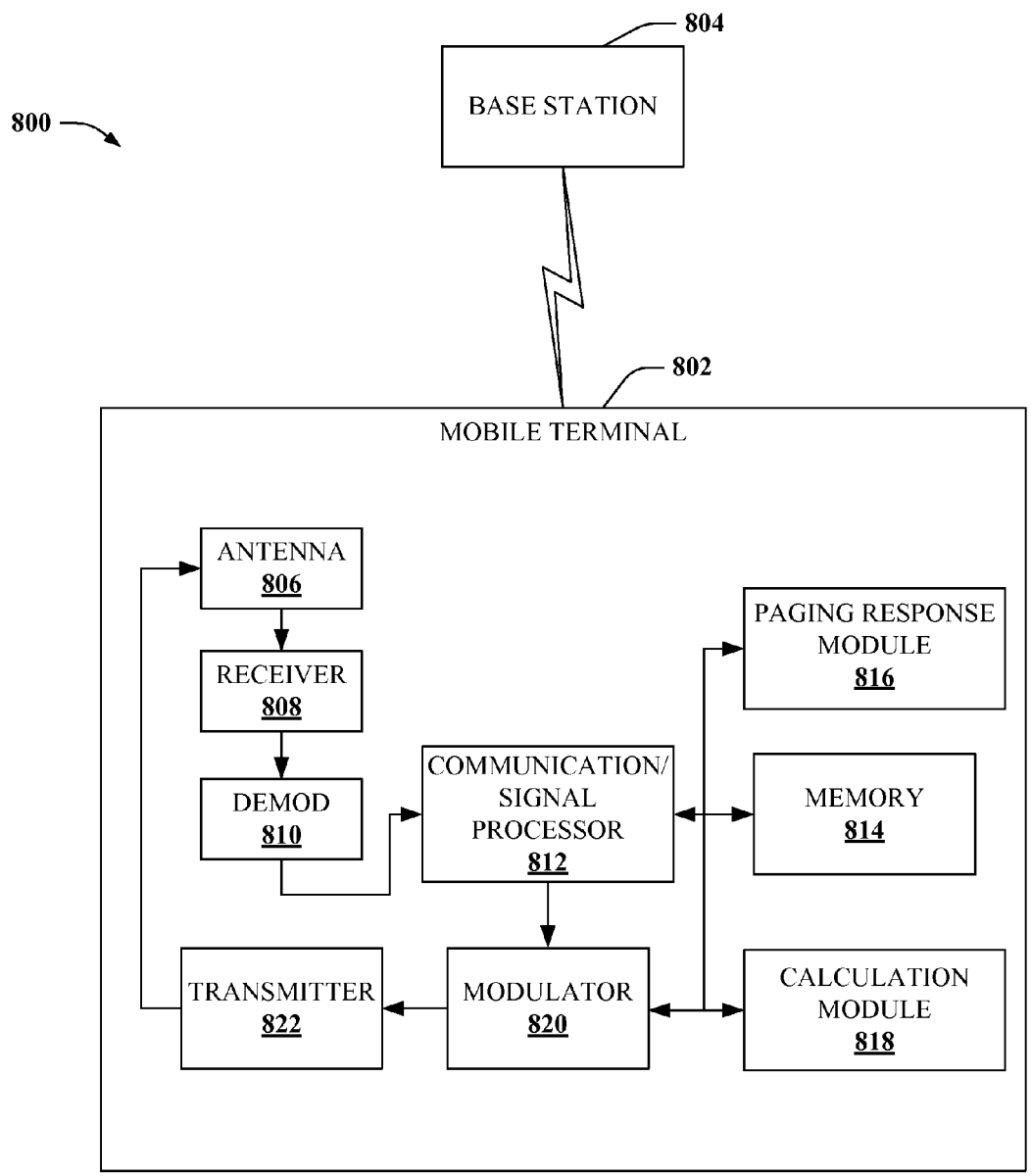
FIG. 8 illustrates a block diagram of an example system comprising a mobile device according to further aspects of the subject disclosure.

When the mobile device 304 is actively engaged in data and/or voice communication, typical communication and processing functions are employed at the device 304 to facilitate such communication, as known in the art (e.g., see FIG. 8, infra). When not actively engaged in data and/or voice communication, mobile device 304 can enter an idle state for significant periods of time to reduce device processing and associated power consumption. When idle, very little information transmitted by the access point 306 is processed by the mobile device 304. However, in order to identify inbound calls, the device 304 can monitor a subset of wireless signals transmitted by the access point 306 for paging signals pertinent to the mobile device 304. Coordination of which subset of signals contain the paging signals, and thus which subset of signals mobile device 304 should monitor, can be established by paging apparatus 302.

According to at least some aspects of the subject disclosure, paging apparatus 302 can comprise a timing module 308 that divides a wireless signal 316 transmitted by access point 306 at least into a plurality of signal time frames. The signal time frames can be periodically repeated, for instance, for multiple DRX cycles of the wireless signal 316. Each signal time frame can be employed to convey different information, such as synchronization information (e.g., synchronization pilot signal, primary synchronization sequence [PSS], secondary synchronization sequence [SSS]), control channel information, paging information, traffic data and/or the like. A subset of the signal time frames of wireless signal 316, determined by selection module 310, can comprise paging control information for mobile devices (304) served by the access point 306 (e.g., see FIG. 6, infra). Each time frame comprising paging control information can be termed a paging occasion. Selection module 310 can determine paging occasions from available time frames of the wireless signal 316 by employing various selection formulas.

In at least one aspect of the subject disclosure, timing module 308 can employ a formula comprising an integer raised to a constant power (e.g., Int^K, where Int is an integer and K is a constant) to determine a number, Z, of time frames of the wireless signal 316 per cycle (e.g., DRX cycle, signal superframe, or the like, as suitable to a network architecture implemented at access point 306). In such aspects, selection module 310 can employ a different formula based on the integer and/or constant to determine a number, N, of paging occasions from the Z time frames.

Position of paging occasions within wireless signal 316 can be determined from formulas utilized by selection module 310 to select paging occasions. Alternatively, the position of the paging occasions can be a default position. In one aspect of the subject disclosure, the positions can be grouped into a contiguous portion of wireless signal 316 (e.g., see system 600A of FIG. 6, infra). In another aspect, the positions can be distributed throughout the wireless signal, as determined by a selection formula that selects the paging occasions (e.g., see system 600B of FIG. 6, infra). It should be appreciated that number, position, length, etc., of paging occasions can be transmitted to mobile device 304, as well as a particular paging occasion/paging group pertinent to mobile device 304.

Paging apparatus 302 can further comprise a transmission processor 312. Transmission processor 312 can implement various wireless communications for access point 306. In one aspect, transmission processor 312 can schedule control channel information into a wireless signal 316. The control channel information can specify system information, including identifying paging resources (e.g., paging occasions/paging groups) of the wireless signal 316. In at least one aspect, transmission processor 312 can identify a particular paging resource assigned to mobile device 304. Such resource can be determined from established paging resources based on a selection algorithm that employs an identifier of the mobile device 304. The identifier can be, for instance, a mobile subscriber identity [MSI], an IMSI, a data session identifier (e.g., mobile network data address, Internet protocol [IP] address, or the like), or an identifier specified by a mobile network serving the mobile device 304, or a like identifier(s), or a combination thereof. According to at least one aspect of the disclosure, transmission processor 312 can select a paging resource for mobile device 304 based on the following formula:

$$\text{paging occasion} = (\text{IMSI div } L) \bmod N,$$

where N is a total number of paging occasions of wireless signal 316. Assignment of paging resources to mobile devices (304) coupled with access point 306, as well as pertinent identifiers of the mobile devices (304), can be stored in memory 314. The assignment can be maintained as a list, for instance, that can be broadcast to mobile devices (304) coupled with the access point 306. In some aspects, assignment of paging resource(s) to mobile device 304 can be determined and unicast to such device 304. Accordingly, transmission processor can coordinate paging resources of the wireless signal 316 with mobile device 304, enabling the device 304 to process only a fraction of received signals in idle mode, conserving significant processing power and battery life.

Figure 4:
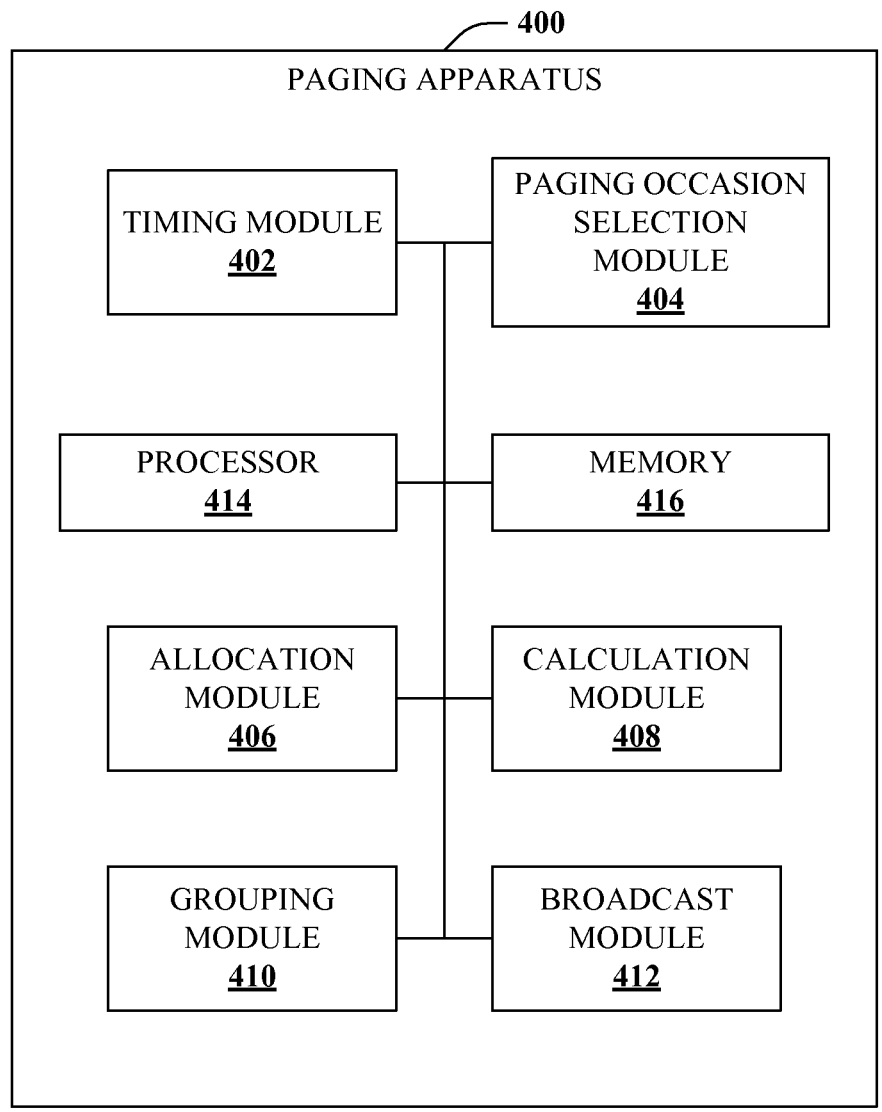
FIG. 4 depicts a block diagram of a sample paging apparatus for an OFDMA wireless AN according to aspects of the subject disclosure.

FIG. 4 depicts a block diagram of a sample paging apparatus 400 for an OFDMA wireless AN according to aspects of the subject disclosure. In some aspects, paging apparatus 400 can be coupled with a base station (not depicted) of a wireless AN (e.g., E-UTRAN) to provide paging controls for the base station. In other aspects, paging apparatus 400 can be coupled with a central controller (e.g., see FIG. 1, supra, at 130) to provide paging controls for multiple base stations of the wireless AN. Paging controls provided by paging apparatus 400 can comprise paging resources dedicated for one or more mobile devices served by an access point(s) of the wireless AN, as well as a signal resource(s) shared by all such devices for broadcasting system information. Accordingly, paging apparatus 400 can facilitate low power idle mode for mobile devices by coordinating paging resources with the devices, as described herein and/or known in the art.

Paging apparatus 400 can comprise a timing module 402 that segments a wireless signal transmitted by an access point of a wireless AN into multiple time frames. In some aspects of the disclosure a number of such time frames per signal, or per DRX cycle for instance, can be based on a algorithm comprising an integer (e.g., two) raised to a constant power (e.g., where the constant is determined from a DRX cycle of the wireless signal). Paging apparatus 400 can further comprise a selection module 404 that selects a number of paging occasions utilized to transmit paging signals for one or more mobile devices. The number of paging occasions, N, is a subset of the number of time frames and can be selected as described herein.

Paging apparatus 400 can further comprise an allocation module 406 that can group paging occasions into a contiguous portion of a wireless signal. The contiguous portion can be repeated for each DRX cycle of the wireless signal. As one example, the allocation module 406 can schedule the N paging occasions to the first N time frames (or, e.g., another suitable contiguous portion) of selected DRX cycles, periodic DRX cycles, each DRX cycle, etc., of the wireless signal.

Alternatively, or in addition to the foregoing, paging apparatus 400 can comprise a calculation module 408. Calculation module 408 can determine a distributed arrangement of paging occasions (e.g., as opposed to a contiguous arrangement) based on a formula employing an integer, Int, raised to a power of a constant (e.g., a DRX cycle coefficient, a number of frames in a cycle, cycle length, or other suitable constant). In some aspects, the integer can be the same integer employed by timing module 402 to define the signal time frames of a wireless signal (or, e.g., DRX cycle). According to particular aspects, the integer can be two and the constant can be a DRX cycle constant.

As a particular, non-limiting example of the foregoing, calculation module 408 can select and/or arrange the N paging occasions by employing a formula of the form:

$$\text{frame number mod Int}^\wedge K <= N-1$$

where frame number is an identifier of a particular frame (e.g., a sequential order of the frame with respect to other frames), Int is the integer utilized by timing module 402 to determine the number, Z, of time frames of the wireless signal 316, and where K is a DRX cycle constant. In at least one aspect of the subject disclosure, Int=2, such that cycles of wireless signal 316 comprise $2^\wedge K$ time frames and paging occasions are determined from the formula:

$$\text{frame number mod } 2^\wedge K <= N-1.$$

As an alternative example to the foregoing, paging occasions can be determined from the following formula:

$$\text{frame number mod Int}^\wedge(K-L)=0.$$

Thus, in aspects where Int=2, the paging occasions are determined based on frame number mod $2^\wedge(K-L)=0$. It should be appreciated that various formulas can be utilized by calculation module 408 to arrange paging occasions instead of, or in addition to, the foregoing example formulas. Thus, the foregoing formulas are not to be construed as limiting the subject disclosure to the particular form articulated herein. Rather, like mechanisms for selecting paging occasions, known in the art or made known to one of skill in the art by way of the context provided in the subject disclosure, are incorporated herein.

In addition to the foregoing, calculation module 408 can assign a paging occasion to mobile devices served by an access point, or vice versa. Assignment of the paging occasion can be based on an identifier of the mobile devices. For instance, a unique IMSI can be utilized to determine a paging occasion for a particular mobile device. In one example, an algorithm of the form (IMSI div L) mod N can be utilized by calculation module 408 to select paging occasions for mobile devices. It should be appreciated, however, that other suitable examples exist for assigning a paging occasion to a mobile device; such examples known in the art or made known to one of skill in the art by way of the context provided herein are incorporated into the subject disclosure.

Paging apparatus 400 can further comprise a grouping module 410. Grouping module 410 can provide paging groups (PI-RNTIs) for wireless signals of a mobile network (e.g., E-UTRAN, OFDMA, etc.). The paging groups can be provided at least in part based on identifiers of mobile devices assigned to a paging occasion. For instance, paging groups of a common paging occasion can be distinguished by employing distinct mobile device identifiers of devices assigned to the paging occasion (e.g., by calculation module 408). Accordingly, grouping module 410 can further partition time-based paging resources into identity-based paging resources. Such partitioning can increase a number of distinct resources suitable for sending paging signals to mobile devices, reducing instances of paging false alarms at such devices (e.g., resulting from multiple devices assigned to a single paging resource).

In addition to the foregoing, paging apparatus 400 can comprise a broadcast module 412. Broadcast module 412 is configured to facilitate system-wide paging utilizing minimal signal resources. In some aspects, broadcast module 412 can create a common identity for all remote devices in a cell served by a wireless access point. The common identity can be associated with a selected PI-RNTI resource(s) of a wireless signal. Furthermore, the selected PI-RNTI(s) can be distributed in system control information as a paging channel for all mobile devices in a cell. A mobile device, therefore, can monitor the selected PI-RNTI as well as a dedicated PI-RNTI(s) assigned to the mobile device by calculation module 408, as discussed above. Accordingly, system information can be obtained via the selected PI-RNTI, and device-specific information (e.g., an inbound call) can be obtained via the dedicated PI-RNTI(s).

Paging apparatus 402 can further comprising a processor 414 and memory 416. Processor 414 can be configured to disseminate paging control information to mobile devices served by an access point, or access points of a wireless AN. The paging control information can be broadcast in conjunction with synchronization data, control channel data, or the like. The information can comprise a list of paging resources (e.g., paging occasions and/or PI-RNTIS) utilized by an access point, location of such resources in a wireless signal, and like information. The information can be stored at memory 416, along with other pertinent data such as algorithms utilized to determine time frames of a wireless signal, select paging occasions, assign paging occasions to devices, or such as mobile device identifiers utilized to generate PI-RNTIs and/or assign devices to signal resources, as described herein. Accordingly, paging apparatus 400 can, in some aspects of the subject disclosure, comprise a paging system suitable to implement, disseminate and maintain system paging for an OFDMA, E-UTRAN, or like mobile communication network.

Figure 5:
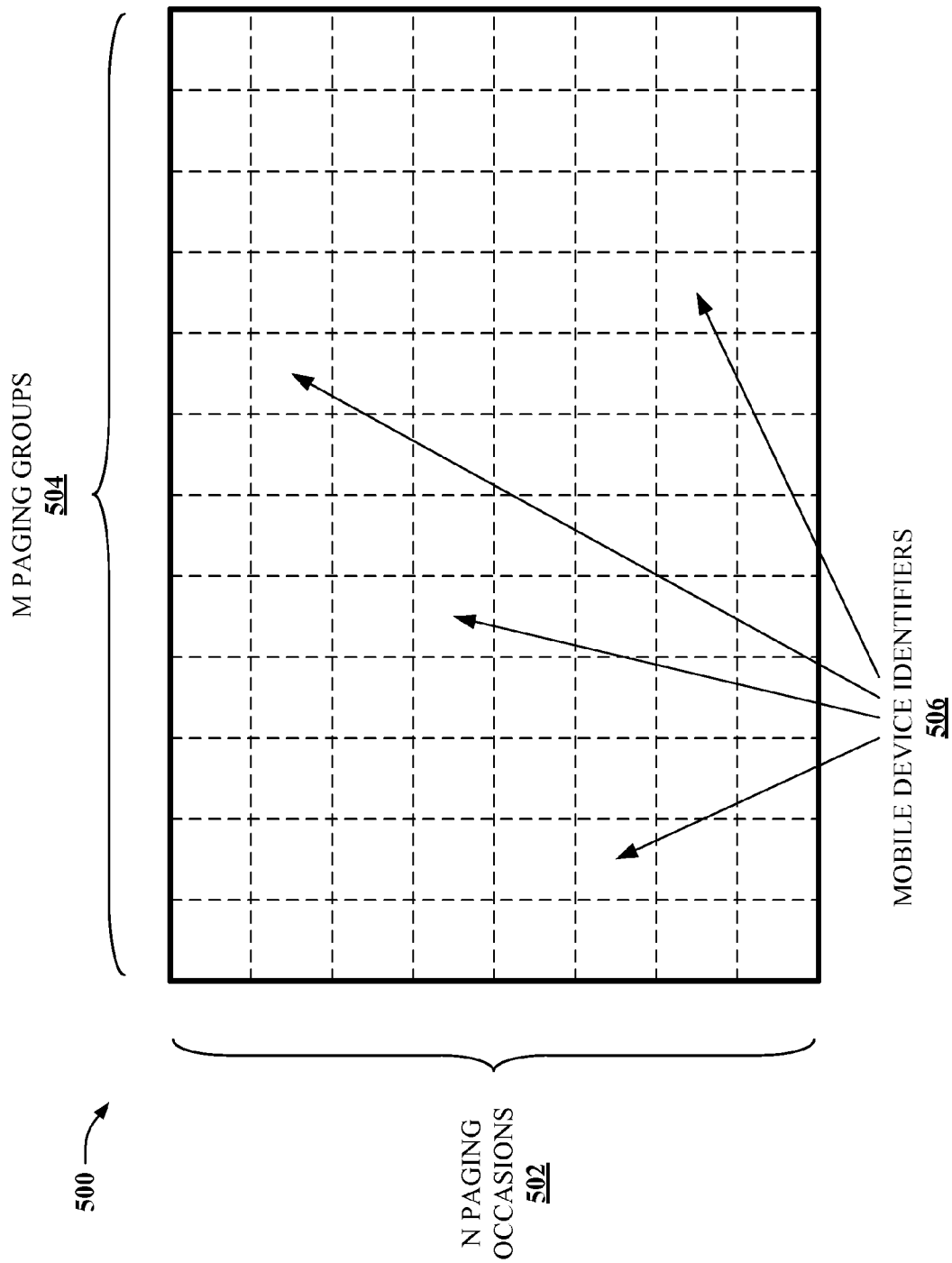
FIG. 5 illustrates a block diagram of example wireless signal paging resources according to aspects of the subject disclosure.

FIG. 5 illustrates a block diagram of example wireless signal paging resources according to aspects of the subject disclosure. Specifically, FIG. 5 illustrates a two-dimensional array 500 of paging resources of a wireless signal. The array 500 can comprise 'N' paging occasions and 'M' paging groups (e.g., PI-RNTIs). Paging occasions, as utilized herein, can comprise time-based segments of the wireless signal, such as time frames. Paging groups, as utilized herein, can comprise identity-based partitions of the paging segments. A paging resource corresponds with a paging occasion/paging group intersection block of the array 500. Thus, array 500 comprises 'M'×'N' paging resources, and can therefore provide substantially 'M'×'N' distinct paging resources for 'M'× 'N' mobile devices. In some aspects of the subject disclosure, at least one paging resource can be reserved for broadcast paging of system information for all devices served by a particular cell.

To distinguish the 'M' paging groups for each paging occasion, a mobile device identifier 506 can be assigned to each resource block of the paging resource array 500. Thus, for instance, an IMSI, MSI, IP address, media access control (MAC) address, or other suitable identifier of a mobile device can be employed to distinguish paging group resources, whether such identifiers are unique to devices globally (e.g., such that no other device has the same identifier in the same context) or locally (e.g., such that no other device has the same identifier at a given point in time, coupled with a given access point, served by a given mobile network, and/or the like). For a paging resource reserved for cell-wide broadcast paging signals, a common identifier can be assigned by a network component to the reserved paging resource and provided to each device in the cell. Thus, such devices can identify system-wide paging at least in part utilizing the common identifier.

According to additional aspects of the disclosure, an assignment of paging resources can be provided in a DL signal to mobile devices. In one example, the paging arrangement of all resources can be broadcast to all devices. The broadcast can further specify an algorithm for identifying an assigned paging resource based on an identifier of receiving devices (e.g., IMSI). Thus, in such aspects mobile devices can employ the algorithm to identify which a paging resource(s) to monitor in order to inbound communications. In addition, the broadcast can identify the system-wide paging resources to be monitored and processed by all devices of a cell. Alternatively, or in addition, an access point can send a unicast message to a mobile device specifying a paging resource(s) and location(s) of such resource(s) pertinent to that device. In such aspects, the mobile device can simply receive the paging resource information and monitor the specified resources to obtain indication of inbound communication.

Figure 6:
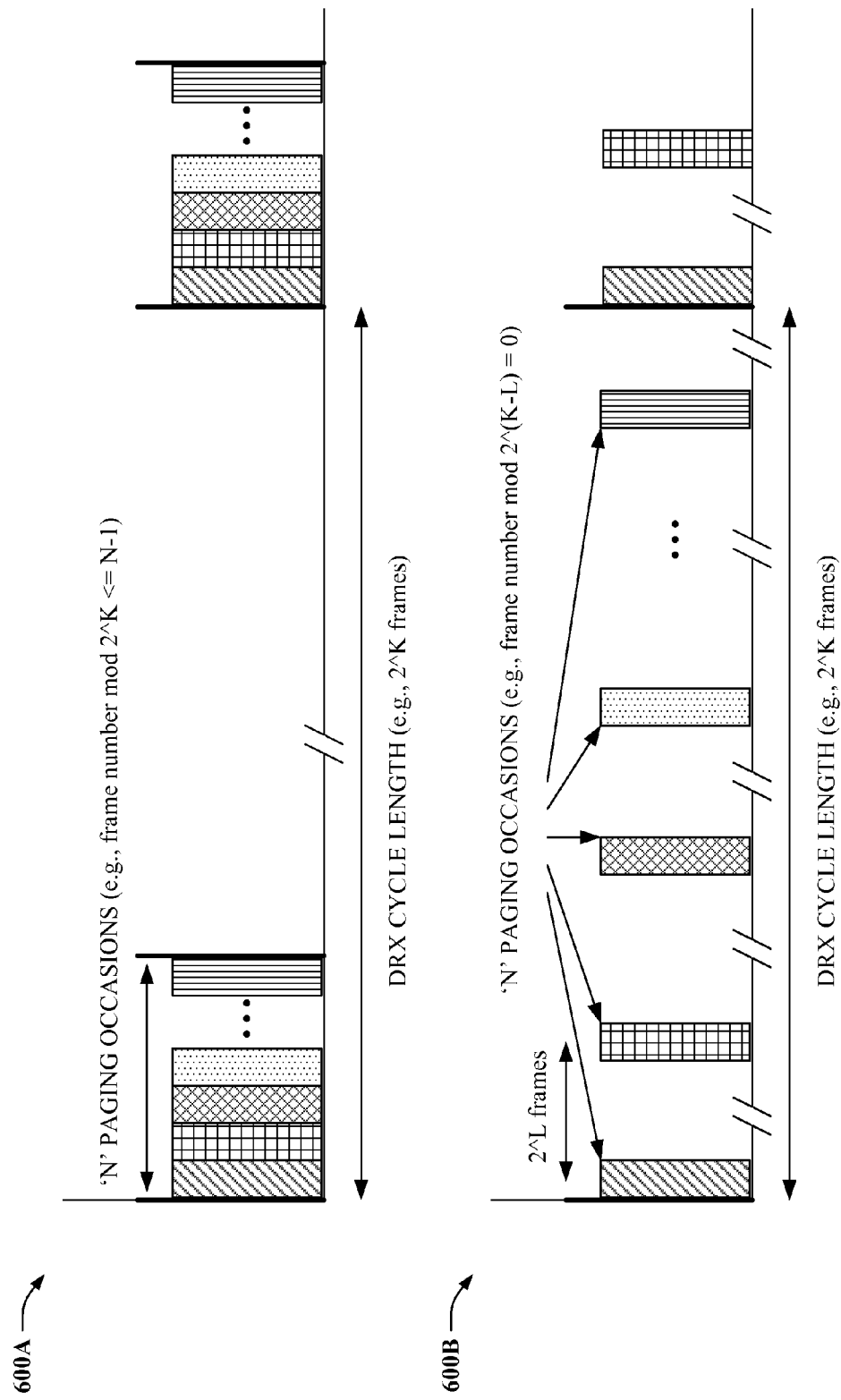
FIG. 6 depicts sample distributions of wireless signal resources for paging according to one or more aspects disclosed herein.

FIG. 6 depicts sample distributions (600A, 600B) of wireless signal paging resources according to one or more aspects of the subject disclosure. The distributions 600A, 600B depict alternative mechanisms for assigning/selecting paging occasions determined as described herein. In the first distribution 600A, paging occasions are grouped into at least one contiguous portion of a wireless signal. The portion can be repeated in multiple DRX cycles of the wireless signal, select DRX cycles, or the like. In particular aspects of the disclosure, a number, N, of time frames of the signal utilized for paging occasions can be determined based on a power of two algorithm (e.g., N=2^L). Once determined, the paging occasions are grouped into one or more contiguous portions of a DRX cycle. In at least one aspect of the subject disclosure, the following formula can be utilized to determine number and/or position of the grouped paging occasions within the wireless signal:

$$\text{frame number mod } 2^K <= N-1$$

Location of the contiguous portion(s) can be transmitted to remote devices utilizing broadcast messaging, unicast messaging or a combination thereof or of the like. Furthermore, the contiguous portion(s) can be included in a single cycle of the wireless signal, included periodically in multiple cycles, included in select multiple cycles, modulated into multiple cycles, or the like.

Distribution 600B illustrates a distributed arrangement of paging occasions. A plurality of N paging occasions can be selected based on a power of two algorithm. The power of two algorithm can be utilized, for instance, to select particular time segments of a wireless signal for paging resources. In particular aspects, the base integer two can be raised to a constant, K, power in the algorithm, where K is determined from a length of a DRX cycle (based on, e.g., number of total time frames 2^K) of the wireless signal. According to at least one aspect, the following formula can be utilized to determine the distributed paging occasions:

$$\text{frame number mod } 2^{(K-L)}=0. \qquad (1)$$

The paging occasions can be distributed throughout the DRX cycle of the wireless signal based on the frame number of selected paging occasions.

Distribution arrangements (600A, 600B) can be submitted to mobile devices coupled with an access point of a wireless AN. In addition, the devices can submit to the access point identifier information that can be utilized to provide the paging resources, where suitable. By sharing distribution information, a mobile device can determine which paging resources are allocated to such device. Accordingly, the mobile device can go into an idle mode when not participating in active voice or data communication, monitoring substantially only the paging occasions of the wireless signal pertinent to the mobile device.

Figure 7:
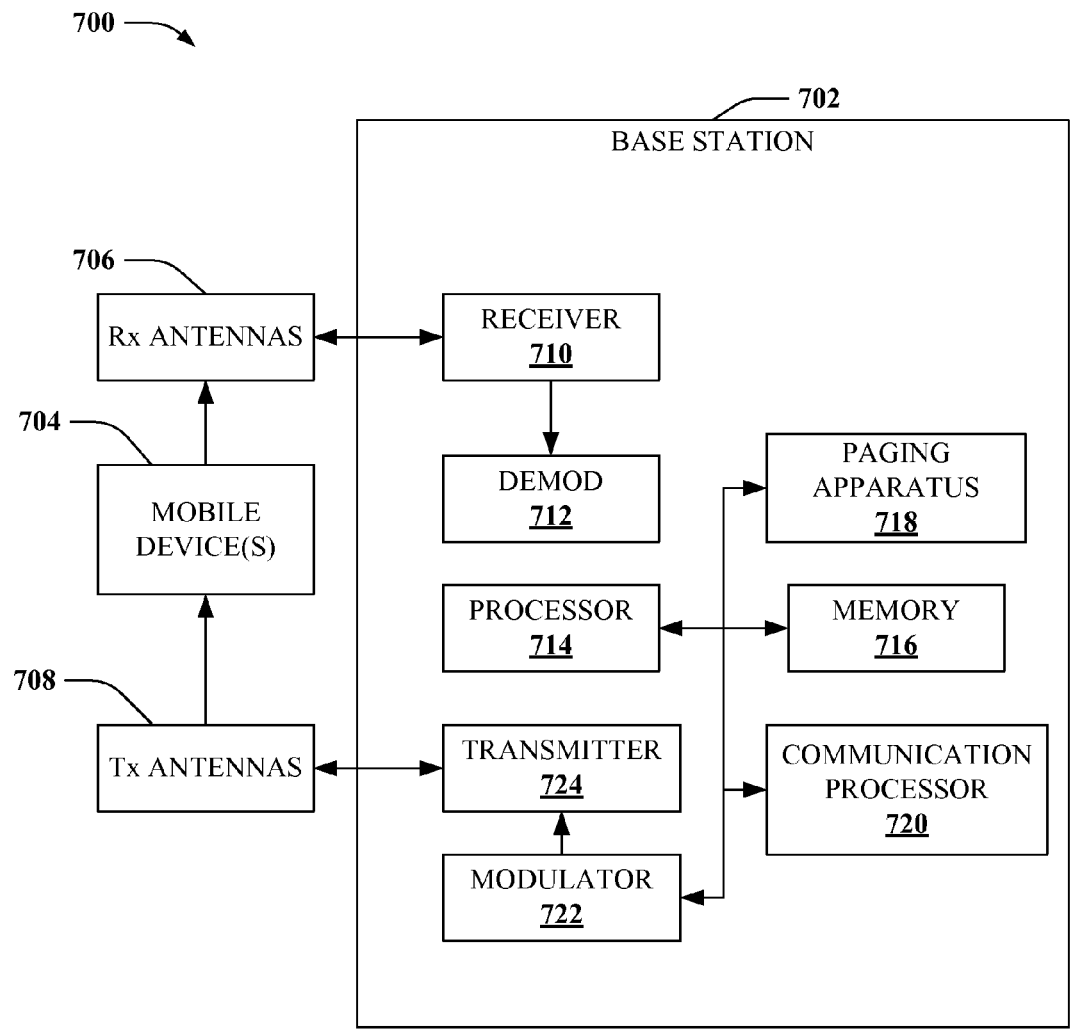
FIG. 7 depicts a block diagram of a sample system comprising a base station according to at least one aspect of the disclosure.

FIG. 7 depicts a block diagram of a sample system 700 comprising a base station 702 according to at least one aspect of the disclosure. Base station 702 can be configured to provide paging controls for AT(s) 704 (e.g., mobile devices). For instance, base station 702 can be configured to provide paging resources for wireless signals transmitted by transmitter 724 and transmit antenna(s) 708. The paging resources can include paging occasions, paging groups and the like, as described herein or known in the art.

Base station 702 (e.g., access point, . . . ) can comprise a receiver 710 that receives signal(s) (e.g., over-the-air [OTA] messages) from one or more ATs 704 through one or more receive antennas 706, wherein the transmitter 724 transmits modulated signals provided by modulator 722 to the one or more ATs 704 through transmit antenna(s) 708. Receiver 710 can receive information from receive antennas 706 and can further comprise a signal recipient (not shown) to receive uplink data transmitted by AT(s) 704. Additionally, receiver 710 is operatively associated with a demodulator 712 that demodulates received information. Demodulated symbols are analyzed by a processor 714. Processor 714 is coupled to a memory 716 that stores information related to functions provided by base station 702. In one instance, stored information can comprise protocols for functions implemented by paging apparatus 718. Such functions can comprise defining time-based segments for a transmitted signal. Furthermore, the functions can comprise selecting paging occasions from a plurality of the time-based segments (e.g., utilizing a power of two based algorithm), providing paging groups, obtaining identifier information from the AT(s) 704, employing the identifier information in establishing the paging groups, assigning AT(s) 704 to one or more paging occasions and/or paging groups, providing a common paging occasion/group for cell-wide paging signals, or the like, as described herein.

Additionally, processor 714 and memory 716 can be coupled with a communication processor 720. Communication processor 720 can schedule paging channel arrangements into wireless signals transmitted by base station 702. The paging channel arrangements can be broadcast to the AT(s) 704, or unicast to one or more particular AT(s). Accordingly, AT(s) 704 can receive the paging channel arrangements and determine which portion of the wireless signal should be monitored to obtain paging signals from base station 702.

FIG. 8 depicts a block diagram of an example system 800 comprising a mobile terminal 802 configured to facilitate wireless communications in a mobile communication environment. Mobile terminal 802 can be configured to wirelessly couple with one or more base stations 804 (e.g., access point) of a wireless AN (e.g., FDM, FDMA, OFDMA, E-UTRAN). Mobile terminal 802 can receive wireless signals (e.g., OTA messages) from the base station 804 on a DL channel and respond with wireless signals on an UL channel, as known in the art. In addition, mobile terminal 802 can submit an identifier pertinent to the mobile terminal 802 on the UL channel to the base station 804. The identifier can be a unique identifier (e.g., IMSI, MAC address), or semi-unique identifier that is distinct with respect to other mobile devices coupled to the base station 804 (e.g., MSI, IP address, data session identifier, or the like). In addition, mobile terminal 802 can extract information identifying paging control arrangements from signals provided by the base station 804. In at least one aspect of the disclosure, the paging control arrangements can be based at least in part on the identifier of the mobile terminal 802. According to further aspects, mobile terminal 802 can employ a formula based on the identifier to determine a paging resource assigned to the mobile terminal 802 from base station 804. According to still other aspects, paging control arrangements can comprise a universal paging resource applicable to all remote devices (802) coupled to the base station 804 (e.g., employing a common identifier provided in a DL signal to mobile terminal 802).

Mobile terminal 802 includes at least one antenna 806 (e.g., a transmission receiver or group of such receivers comprising an input interface) that receives a signal and receiver(s) 808, which performs typical actions (e.g., filters, amplifies, down-converts, etc.) on the received signal. In general, antenna 806 and transmitter 822 (collectively referred to as a transceiver) can be configured to facilitate wireless data exchange with base station(s) 804. According to at least some aspects, a communication signal processor(s) 812 can schedule the identifier of mobile device 802 into an UL signal transmitted by transmitter 822 to the base station 804. Such UL signal can be transmitted, for instance, in conjunction with registering the mobile device 802 with a wireless AN (not depicted) associated with the base station 804.

Antenna 806 and receiver(s) 808 can also be coupled with the demodulator 810 that can demodulate received symbols and provide them to communication processor(s) 812 for evaluation. It should be appreciated that communication processor(s) 812 can control and/or reference one or more components (806, 808, 810, 814, 816, 818, 820, 822) of the mobile terminal 802. Further, communication processor(s) 812 can execute one or more modules, applications, engines, or the like (816, 818) that comprise information or controls pertinent to paging controls provided by base station 804, as described herein.

Mobile terminal 802 can additionally include memory 814 that is operatively coupled to communication processor(s) 812. Memory 814 can store data to be transmitted, received, and the like, and instructions suitable to conduct wireless communication with a remote device (804). Further, memory 814 can store the modules, applications, engines, etc. (814, 818, 820, 822) executed by communication processor(s) 812, above.

The communication processor 812 can further comprise a signal processor (812) that obtains a paging group assigned to the identifier submitted by the communication processor(s) 812. In some aspects, the paging group can be associated with a paging occasion selected from a subset of signal time frames of a DL signal. The signal time frames can be determined from a formula comprising an integer (e.g., the number two or other suitable integer) raised to a constant power (e.g., where such constant is determined from a DRX cycle associated with the DL signal).

In addition to the foregoing, signal processor (812) can obtain a location of the paging group and/or paging occasion within the DL signal. Moreover, the signal processor (812) can monitor the paging group/occasion to facilitate identifying paging signals for mobile terminal 802. In some aspects, the location of the paging group/occasion can be a portion of a contiguous segment of the DL signal reserved for paging resources. In other aspects, the paging group/occasion can be a distributed identity/time based portion of such signal. A paging response module 816 can extract information from the paging group/occasion and determine whether a paging signal is included therein. If the paging signal is present, communication processor(s) 812 can initiate an access procedure to the wireless AN, for instance, to inform the base station 804 and/or network components associated there with that the mobile terminal 802 is ready to receive inbound communications.

In at least one aspect of the subject disclosure, mobile device 802 can further comprise a calculation module 818 that can identify a paging occasion associated with the mobile device 802 based on the identifier submitted by communication processor 812. The calculation module 818 can utilize a specified formula to identify the paging occasion. The specified formula can be stored in memory 814, provided in a DL signal by base station 804, or the like. In one example, the formula can be of the form: paging occasion=(identifier div L) mod N, where L is a constant utilized to determine a number N of paging occasions of the DL signal. As discussed above, once the paging occasion associated with mobile device 802 is identified, paging response module 816 can determine whether a paging group associated with the paging occasion contains a paging signal. If so, communication processor can initiate the access procedure to a wireless AN or other communication network coupled to the base station 804.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include paging apparatus 302, base station 702, and mobile terminal 802, or a different combination of these and other components. Sub-components could also be implemented as components communicatively coupled to other components rather than included within parent components. Additionally, it should be noted that one or more components could be combined into a single component providing aggregate functionality. For instance, timing module 402 can include selection module 404, or vice versa, to facilitate segmenting a wireless signal into multiple time portions and selecting one or more paging occasions out of such time portions (e.g., employing a power of two based algorithm) by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 9:
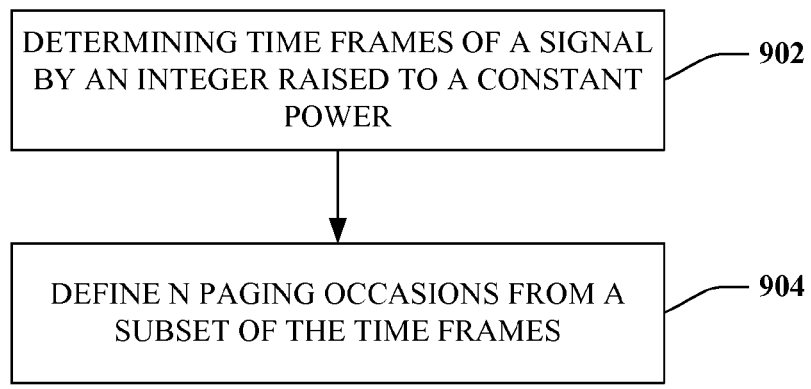
FIG. 9 depicts a flowchart of an example methodology for providing paging control for an OFDMA wireless AN according to aspects disclosed herein.
Figure 10:
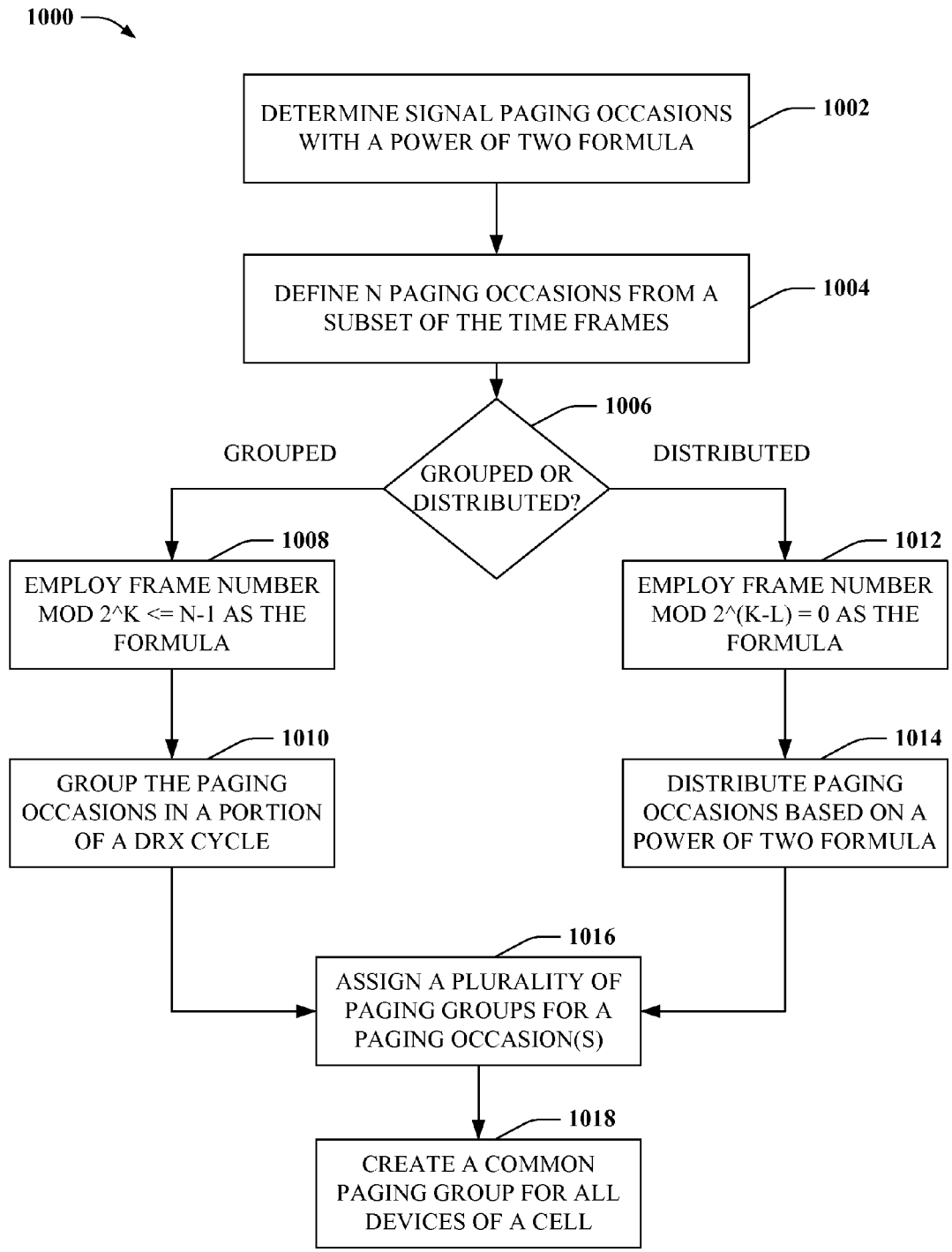
FIG. 10 illustrates a flowchart of an example methodology for providing paging resources of a wireless signal determined from a power of two based formula.
Figure 11:
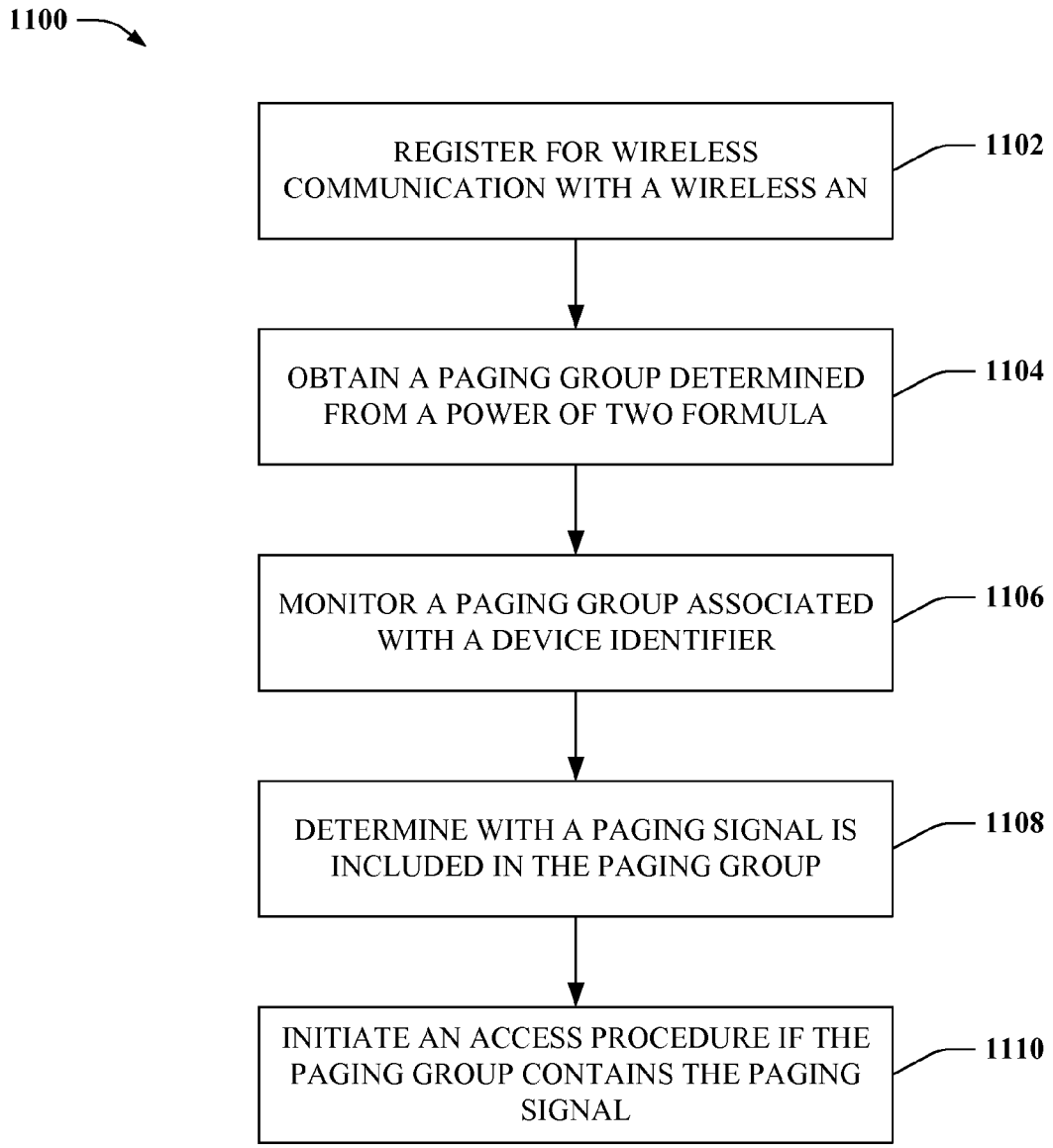
FIG. 11 depicts a flowchart of an example methodology that facilitates paging controls in an OFDMA wireless AN.

In view of the exemplary systems described supra, methodologies that may be implemented in accordance with the disclosed subject matter will be better appreciated with reference to the flow charts of FIGS. 9-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The terms apparatus and article of manufacture, as used, are intended to encompass a computer program accessible from any computer-readable device, device in conjunction with a carrier, or storage medium.

FIG. 9 depicts a flowchart of an example methodology 900 for providing paging control for an OFDMA wireless AN according to aspects disclosed herein. At 902, method 900 can divide a wireless signal into a plurality of signal time frames. The number of signal time frames can be based on an integer raised to a constant power. In some aspects, the integer can be the number two, or other suitable integer. Furthermore, the constant can, in some aspects, comprise a constant associated with a DRX cycle of the wireless signal. By employing such a formula to generate signal time frames, devices can efficiently enter and leave a wireless network employing the divided wireless signal.

At 904, method 900 can select a number, N, of signal time frames as paging occasions. Furthermore, the number N can be a subset of the signal time frames. The signal time frames can be assigned to various remote devices in conjunction with establishing paging controls for mobile communication. Such communication can be in accordance with protocols pertinent to a mobile communication network, such as an FDM, FDMA, OFDMA, E-UTRAN, or like communication and/or access network. The paging controls can be utilized to facilitate efficient idle mobility and power reduction for mobile devices communicatively coupled with the mobile communication network.

FIG. 10 illustrates a flowchart of an example methodology 1000 for providing paging resources of a wireless signal determined from a power of two based formula. At 1002, method 1000 can determine signal paging occasions from signal time frames of a wireless signal utilizing a power of two formula, as described herein, and discussed below. At 1004, method 1000 can select N paging occasions from a subset of the signal time frames based on the formula. At 1006, a determination is made as to whether the paging occasions are grouped within the wireless signal (e.g., in one or more contiguous signal time frames of a DRX cycle(s) of the signal), or distributed throughout the wireless signal. If grouped, method 1000 can proceed to 1008; otherwise method 1000 can proceed to 1012.

At 1008, method 1000 can select a set of paging occasions from the time frames of the wireless signal based on a first power of two formula. In some aspects of the subject disclosure, the power of two formula can be:

frame number mod $2^K <= N-1$ as described herein. At 1010, method 1000 can group the selected set of paging occasions into a portion of a DRX cycle of the wireless signal. In some aspects, the portion can be repeated in multiple DRX cycles of the wireless signal. For instance, the paging occasions can periodically be in portions of multiple DRX cycles. In another example, the paging occasions can be present in select DRX cycles, but not in other cycles. It should be appreciated that various suitable arrangements wherein the paging occasion group is modulated within a plurality of DRX cycles is contemplated as within the scope of the subject disclosure. From reference number 1010, method 1000 can proceed to 1016.

At 1012, method 1000 can select a set of distributed paging occasions from the time frames of the wireless signal based on a second power of two formula. In some aspects of the subject disclosure, the power of two formula can be:

Frame number mod $2^{(K-L)} = 0$ as described herein. At 1014, method 1000 can distribute the paging occasions of the set throughout one or more signal time frames of the wireless signal as determined by the power of two formula. For instance, the formula can be utilized to select which signal time frames of a DRX cycle are allocated to paging occasions. Method 1000 can proceed from 1014 to 1016.

At 1016, method 1000 can assign a plurality of paging groups for the determined paging occasions. In some aspects of the disclosure, the paging groups can be distinguished utilizing identifiers of a mobile device(s) assigned to a paging group. Thus, method 1000 can provide for time and/or identity based allocation of paging resources, as described herein. At 1018, method 1000 can create a common paging channel group for all remote devices served by an access point of a wireless AN. The paging channel can be utilized to efficiently broadcast system information to all such remote devices. Accordingly, methodology provides for at least one paging channel for each such device, a dedicated channel, a common channel, or both.

FIG. 11 depicts a flowchart of an example methodology 1100 that facilitates paging controls in an OFDMA wireless AN. Method 1100, at 1102, can register for wireless communication with a wireless AN. Registration can at least comprise, for instance, submitting an identifier (e.g., an IMSI) of a mobile device to the wireless AN. At 1104, method 1100 can obtain a paging group assigned to the identifier. The paging group can be determined, in at least one example, based on the identifier of the mobile device and a number of available paging groups for a wireless signal. In one particular example, the paging group can be obtained from an algorithm such as IMSI mode M, where M is the number of available paging groups. The paging group can be submitted over a DL channel and received by an antenna(s) and receiver at the mobile device. In addition, the paging group can be associated with a paging occasion of the DL channel. Such paging occasion can further be determined from a formula comprising an integer (e.g., 2) raised to a constant power (e.g., determined from a DRX cycle of the wireless signal).

At 1106, method 1100 can monitor the received paging group assigned to the identifier. At 1108, method 1100 can determine whether a paging signal is included in a resource addressed for the paging group. If so, at 1110, method 1100 can initiate an access procedure to the wireless AN. The access procedure can inform the AN that the mobile device can be reached via a particular base station, and that the mobile device is ready to receive inbound communication for such device.

Figure 12:
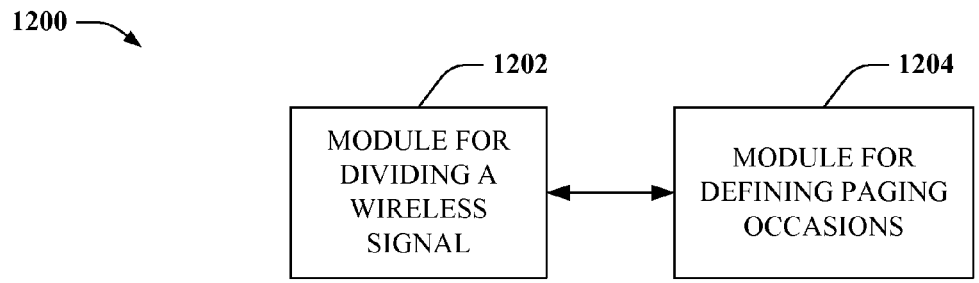
FIG. 12 illustrates a block diagram of an example system for providing paging controls in an OFDMA wireless AN.

FIG. 12 illustrates a block diagram of an example system 1200 for providing paging controls in an OFDMA wireless AN. System 1200 can comprise a module 1202 for dividing a wireless signal into a plurality of signal time frames. The module 1200 can determine a number of such signal time frames based, for instance, on a formula comprising an integer raised to a constant power. In at least one aspect, the integer can comprise the number two, or other suitable integer that provides a efficient integration of mobile devices from external systems (e.g., CDMA, W-CDMA) into a local system (e.g., FDM, OFDMA, E-UTRAN, etc.). Additionally, the constant power can comprise a constant K, determined at least in part from a DRX cycle associated with the wireless signal. In addition to the foregoing, system 1200 can comprise a module 1204 for selecting paging occasions from the signal time frames. In some aspects, the module 1204 can select a subset of the signal time frames as paging occasions. Furthermore, the paging occasions can be scheduled by module 1204 into various portions of the wireless signal, such as a contiguous group(s) of time frames of the signal (or, e.g., of one or more DRX cycles of such signal), or to distributed time frames, determined from a power of two based formula. In one example, the continuous time frames can be selected based on the formula: frame number mod $2^K <= N-1$. In at least one alternative example, the distributed time frames can be selected based on the formula: frame number mod $2^{(K-L)}=0$. Arrangement of paging occasions within the signal, whether in a contiguous portion(s) or distributed, can be provided to remote devices (not depicted) to facilitate synchronization of paging channels between the remote devices and system 1200.

Figure 13:
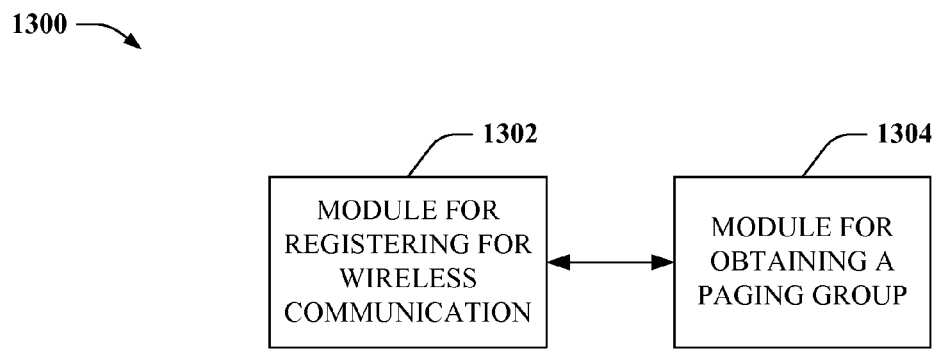
FIG. 13 illustrates a block diagram of a sample system that facilitates paging controls in an OFDMA wireless AN.

FIG. 13 illustrates a block diagram of a sample system 1300 that facilitates paging controls in an OFDMA wireless AN. System 1300 can comprise a module 1302 for registering for wireless communication. Registration can be, for instance, with a mobile communication network via a wireless access point coupled to such network. In some aspects, the module 1302 can include an identifier of a mobile device in conjunction with the registration, where the identifier is a global identifier (e.g., IMSI, MAC address), or semi-global or local identifier (e.g., IP address, MSI, data session identifier, and so on). Additionally, system 1300 can comprise a module 1304 for obtaining a paging group by way of wireless communication. Furthermore, the paging group can be associated with the identifier by an access point of a wireless AN (e.g., E-UTRAN). In at least one aspect, the paging group can be associated with a paging occasion that is selected from a subset of signal time frames of a DL signal. Selection of the paging occasion from the signal time frames can, in at least one example, be based on a formula comprising an integer (e.g., the number two) raised to a constant power. Location of the paging group within the DL signal can be obtained from such signal, either directly or indirectly by employing the formula and identifier.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim

What is claimed is:

1. A method of paging remote devices in a wireless access network (AN), comprising:
   dividing a wireless signal into a plurality of signal time frames defined as an integer raised to a constant power, $Int^K$ where K is a constant;
   selecting a number, N, of the signal time frames as paging occasions where N is a subset of the signal time frames; and
   employing at least one of the following formulae to select the N paging occasions:
   frame number mod $2^K<=N-1$; and
   frame number mod $2^{(K-L)}=0$, where L is a constant utilized to determine a number N of paging occasions of a downlink signal.

2. The method of claim 1, further comprising grouping the N paging occasions into a contiguous portion of a discontinuous reception (DRX) cycle of the wireless signal.

3. The method of claim 1, further comprising distributing the N paging occasions based on a formula that employs integer Int raised to a power of a function of constant K.

4. The method of claim 1, further wherein the integer, Int, is 2.

5. The method of claim 1, further wherein the constant, K, is a coefficient of a discontinuous reception (DRX) cycle.

6. The method of claim 1, further comprising employing a formula:
   paging occasion=(IMSI div L) mod N
   to select one of the N paging occasions for a remote device, where IMSI is the international mobile subscriber identity of the remote device.

7. The method of claim 1, further comprising assigning a plurality of paging groups for a paging occasion.

8. The method of claim 7, further comprising:
   assigning an identifier of a remote device to one of the plurality of paging groups; and
   paging the remote device on the paging group of the paging occasion.

9. The method of claim 1, further comprising creating a common identity for all remote devices in a cell and utilizing the common identity in a specified paging group to page all the remote devices in the cell.

10. An apparatus for paging remote devices in a wireless AN, comprising:
    a timing module that divides a wireless signal into a plurality of signal time frames defined as an integer raised to a constant power, $Int^K$ where K is a constant;
    a selection module that selects a number, N, of the signal time frames as paging occasions where N is a subset of the signal time frames; and
    a calculation module that selects the N paging occasions based on at least one of the following formulae:
    frame number mod $2^K<=N-1$; and
    frame number mod $2^{(K-L)}=0$, where L is a constant utilized to determine a number N of paging occasions of a downlink signal.

11. The apparatus of claim 10, further comprising an allocation module that groups the N paging occasions into a contiguous portion of a discontinuous reception (DRX) cycle of the wireless signal.

12. The apparatus of claim 10, further comprising a calculation module that selects the N paging occasions based on a formula that employs integer, Int, raised to a power that is a function of constant, K.

13. The apparatus of claim 12, the calculation module employs a formula:
    paging occasion=(IMSI div L) mod N
    to select one or more of the N paging occasions for a remote device, where IMSI is the international mobile subscriber identity of the remote device.

14. The apparatus of claim 10, the timing module employs the number two as the integer, Int.

15. The apparatus of claim 10, the timing module employs a coefficient of a discontinuous reception (DRX) cycle as constant, K.

16. The apparatus of claim 10, further comprising a grouping module that assigns a plurality of paging groups for a paging occasion.

17. The apparatus of claim 16, further comprising a transmission processor that pages the remote device on one of the plurality of paging groups by employing an identifier of the remote device.

18. The apparatus of claim 10, further comprising a broadcast module that creates a common identity for all remote devices in a cell and utilizes the common identity in a specified paging group to page all the remote devices in the cell.

19. An apparatus configured for paging remote devices in a wireless AN, comprising:
   means for dividing a wireless signal into a plurality of signal time frames defined as an integer raised to a constant power, Int^K where K is a constant;
   means for selecting a number, N, of the signal time frames as paging occasions where N is a subset of the signal time frames; and
   means for employing at least one of the following formulae to select the N paging occasions:
      frame number mod 2^K<=N-1; and
      frame number mod 2^(K-L)=0, where L is a constant utilized to determine a number N of paging occasions of a downlink signal.

20. A processor configured for paging remote devices in a wireless AN, comprising:
   a first module that divides a wireless signal into a plurality of signal time frames defined as an integer raised to a constant power, Int^K where K is a constant;
   a second module that selects a number, N, of the signal time frames as paging occasions where N is a subset of the signal time frames; and
   a calculation module that employs at least one of the following formulae to select the N paging occasions:
      frame number mod 2^K<=N-1; and
      frame number mod 2^(K-L)=0, where L is a constant utilized to determine a number N of paging occasions of a downlink signal.

21. A non-transitory computer-readable medium, comprising:
   computer-readable instructions configured for paging remote devices in a wireless AN, the instructions are executable by at least one computer to:
   divide a wireless signal into a plurality of signal time frames defined as an integer raised to a constant power, Int^K where K is a constant;
   select a number, N, of the signal time frames as paging occasions where N is a subset of the signal time frames; and
   employ at least one of the following formulae to select the N paging occasions:
      frame number mod 2^K<=N-1; and
      frame number mod 2^(K-L)=0, where L is a constant utilized to determine a number N of paging occasions of a downlink signal.

* * * * *